May 26, 1953  R. C. PALMER  2,639,643
ATTACHMENT FOR LATHES
Filed May 7, 1948  4 Sheets-Sheet 3

*INVENTOR.*
RAYMOND C. PALMER
BY *Wallace and Cannon*
ATTORNEYS

May 26, 1953  R. C. PALMER  2,639,643
ATTACHMENT FOR LATHES
Filed May 7, 1948  4 Sheets-Sheet 4
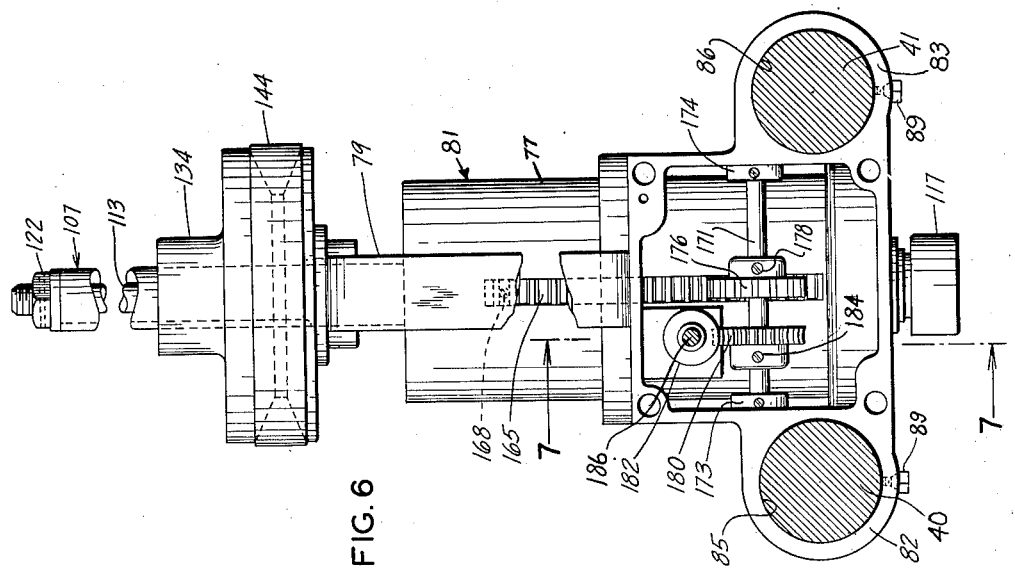
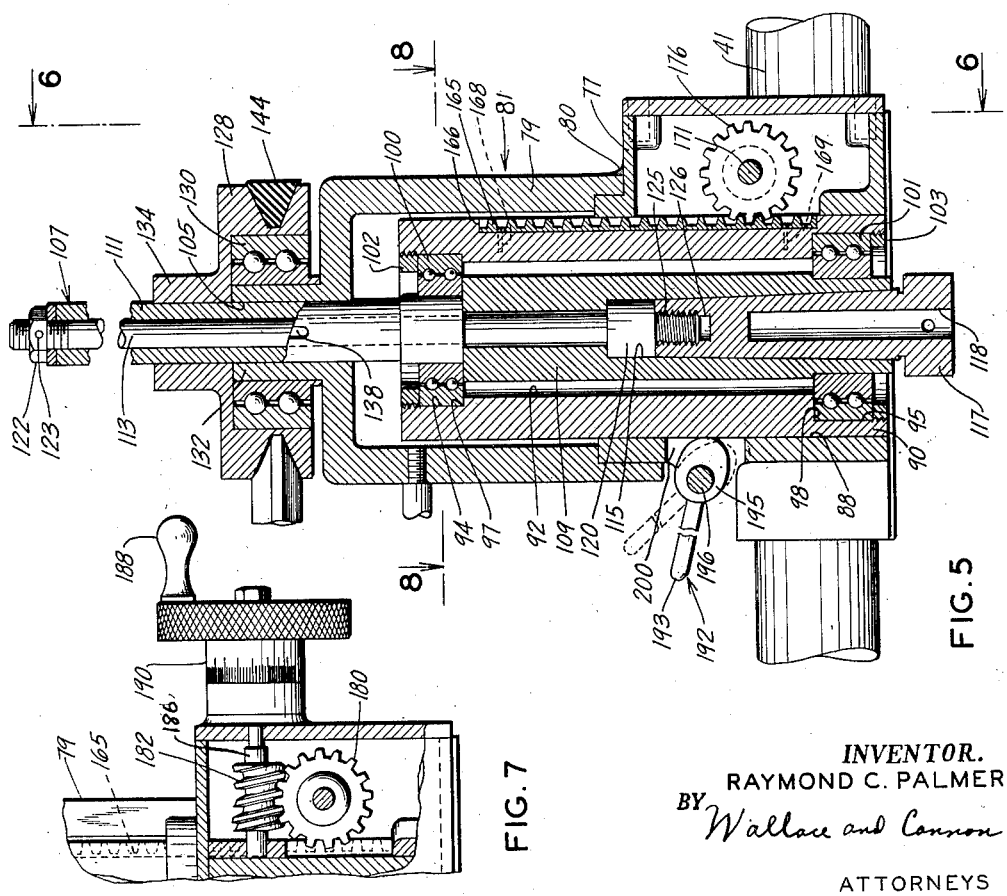
INVENTOR.
RAYMOND C. PALMER
BY Wallace and Cannon
ATTORNEYS

Patented May 26, 1953

2,639,643

UNITED STATES PATENT OFFICE 2,639,643

ATTACHMENT FOR LATHES

Raymond C. Palmer, Chicago, Ill.

Application May 7, 1948, Serial No. 25,765

6 Claims. (Cl. 90—16)

This invention relates to attachments for lathes and, more particularly, to milling and boring attachments for lathes.

This application is a continuation-in-part of my co-pending application, Serial No. 676,145, filed June 12, 1946, and now abandoned.

A primary object of my invention is to afford a novel attachment for lathes whereby milling and boring operations, and the like, may be performed in a novel and expeditious manner.

Another object is to construct an attachment of the aforementioned type in such a manner that a substantially unitary structure is provided which may be quickly and easily mounted in operative position on a lathe and, when so positioned, may be readily operated in an expeditious manner.

A further object of my invention is to provide an attachment for lathes embodying a novel tool-holding device whereby a milling cutter, boring tool, or the like, may be driven by the power unit of the lathe in a novel and practical manner, and the tool-holding device may be quickly and easily adjusted to afford ready adjustment of the position of a tool being used.

Yet another object of my invention is to so construct an attachment of the aforementioned type that it may be readily used, in a novel manner, to machine work-pieces mounted on a carriage which may be operatively connected to the usual longitudinal feed and cross feed of a lathe.

Another object of my invention is to construct a novel attachment of the aforementioned type in such a manner that a tool may be adjustably mounted on a frame which is so constructed and may be so mounted on a lathe that the movable carriage of the lathe is relatively freely movable and may be used in a novel and expeditious manner to feed work past a tool so supported.

A further object of my invention is to provide a novel attachment of the aforementioned type which is sturdily constructed, accurate in operation, and may be manufactured commercially in an economic and practical manner.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 5 is a detail sectional view of the tool-holding device shown in Fig. 1;

Fig. 6 is a sectional view taken substantially along the line 6—6 in Fig. 5;

Fig. 7 is a detail sectional view taken substantially along the line 7—7 in Fig. 6; and Fig. 8 is a sectional view taken substantially along the line 8—8 in Fig. 5.

Figure 1:
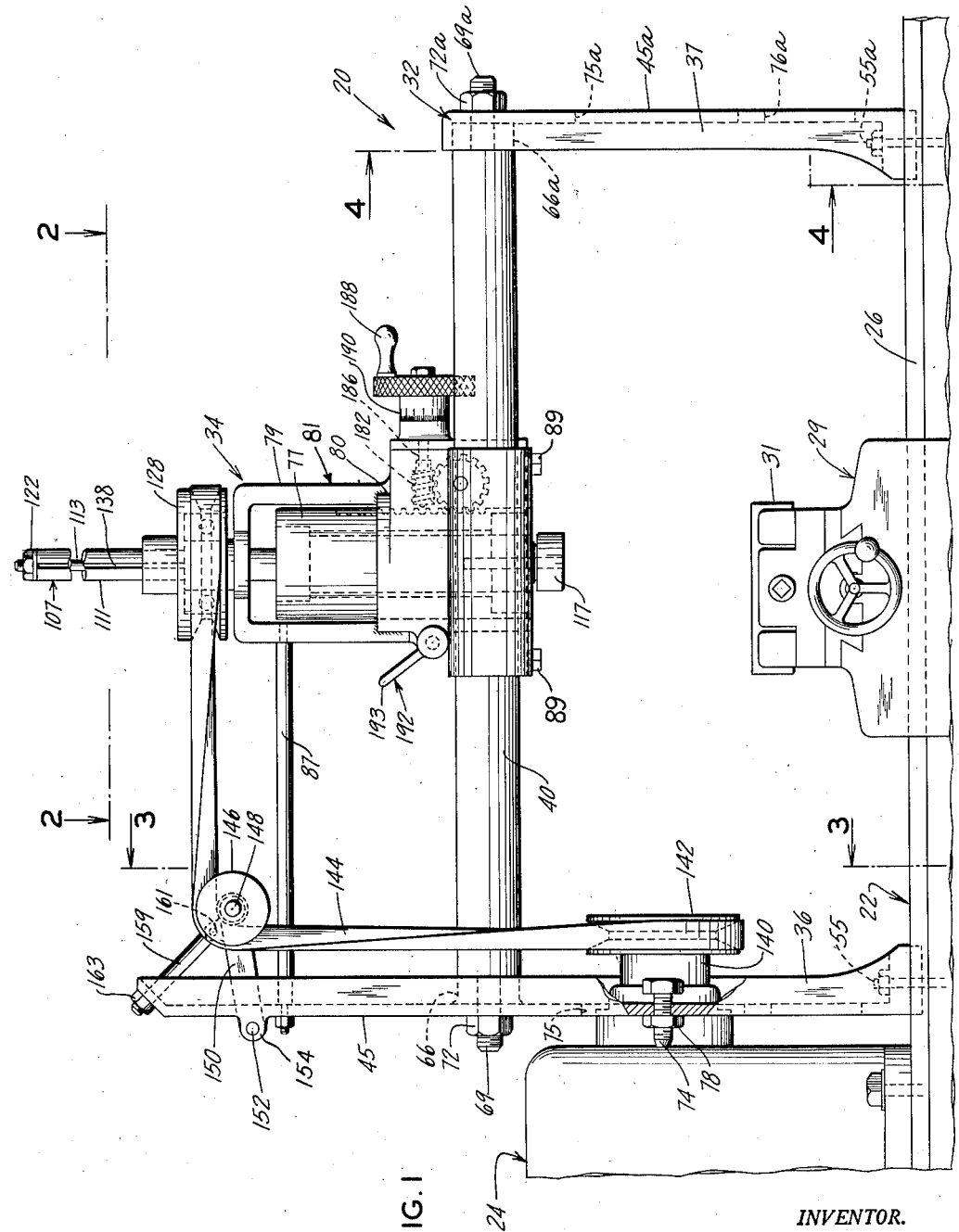
Fig. 1 is a side elevational view of a preferred form of an attachment mounted in operative position on a lathe, and embodying the principles of my invention.

A typical embodiment of my invention is illustrated in Figs. 1 to 8, inclusive, of the drawings, wherein is shown a milling and boring attachment 20 mounted in operative position on a lathe 22, Fig. 1.

Figure 3:
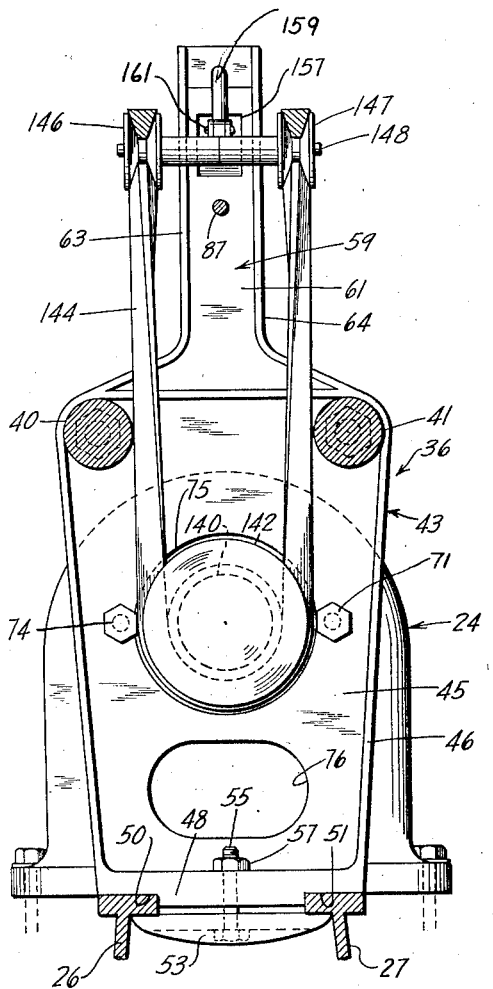
Fig. 3 is a sectional view taken substantially along the line 3—3 in Fig. 1.

The lathe 22 is of the conventional type having the usual head stock 24 and parallel ways 26 and 27, Figs. 1 and 3. The usual travelling carriage 29 is mounted on the ways 26 and 27 and has a work-holding vise 31 mounted thereon, which vise may be any one of several types heretofore known to those skilled in the art and customarily used for such purposes.

The attachment 20 comprises a frame member 32, mounted on the ways 26 and 27 of the lathe 22, and a tool-holding device 34 mounted on the frame 32 and operable to hold and drive various types of tools such as, for example, milling cutters, boring tools, and the like, all of which will be described in greater detail hereinafter.

The frame member 32 comprises two end plates 36 and 37, connected together, in parallel relation, by two parallel side bars 40 and 41.

The end plate 36 has a body portion 43 and an arm 59 projecting upwardly therefrom, Fig. 3. The body portion 43 comprises a substantially flat, central web member 45 surrounded by a reinforcing flange 46, the flange 46 being of sufficient width to afford a rigid structure. The lower portion of the flange 46 is somewhat thicker than the other portions thereof to afford a base 48, and the edges of the base 48 are cut-away to afford recesses 50 and 51 within which the ways 26 and 27, respectively, are engaged when the end plate 36 is mounted in operative position on the lathe 24. The end plate 36 is releasably secured in position on the ways 26 and 27 by suitable means such as a clamping plate 53 held in engagement therewith by a bolt 55 extending through the clamping plate 53 and the base 48 and held therein by a nut 57.

The arm 59 is of somewhat lesser width than the body portion 43, and affords an extension therefor for a purpose which will be discussed in greater detail presently. The arm 59, like the body portion 36 comprises a web 61 having reinforcing flanges 63 and 64 positioned along opposite sides thereof.

Figure 2:
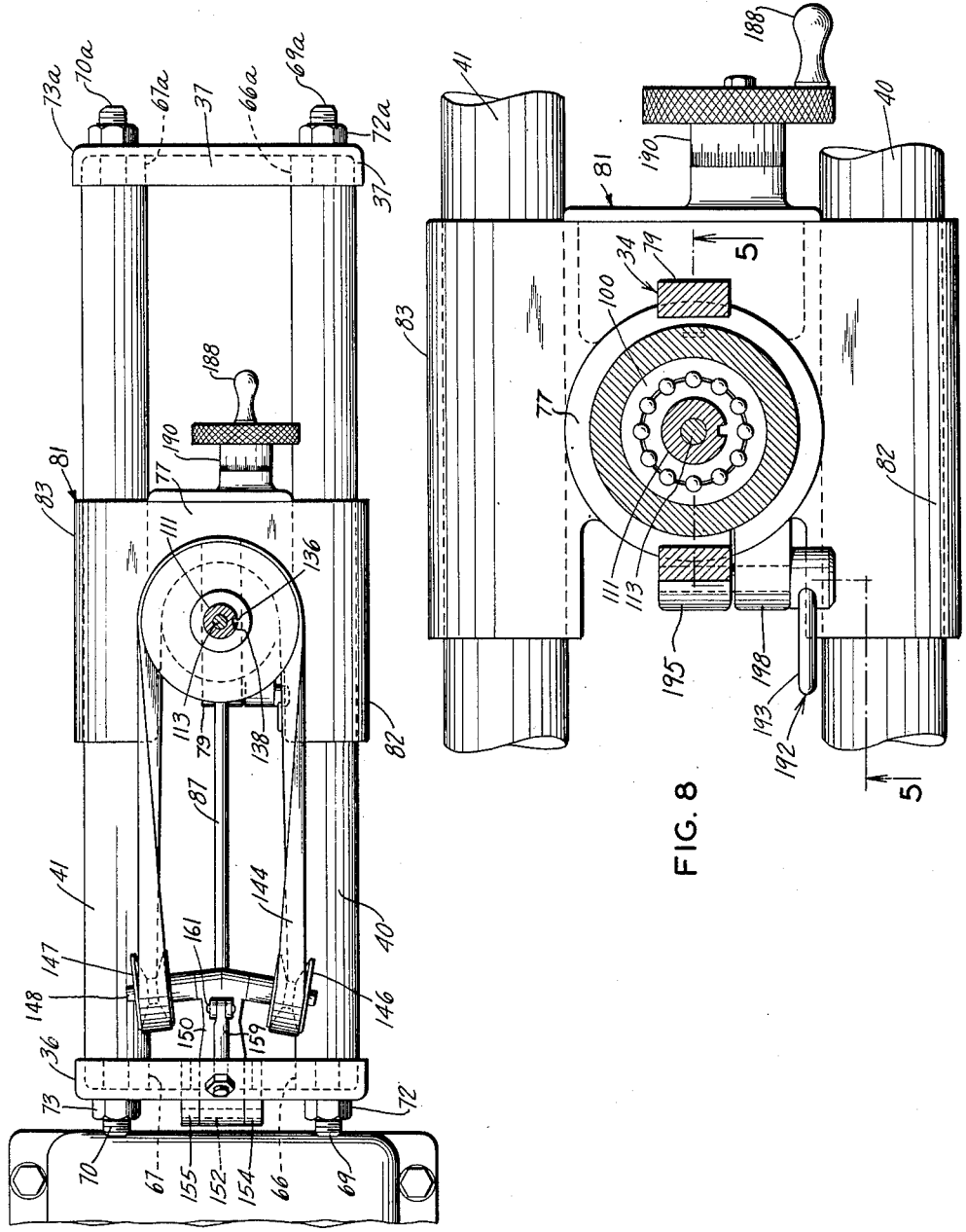
Fig. 2 is a top plan view, partly in section, taken substantially along the line 2—2 in Fig. 1.

Two bosses 66 and 67, Figs. 1 and 2, are formed on the body portion 43 of the end plate 36 and project outwardly from the web 45 thereof into alignment with the free edge of the flange 46. The bosses 66 and 67 have openings formed therein through which threaded end portions 69 and 70 of the side bars 40 and 41, respectively, project, the side bars being releasably secured in this position by nuts 72 and 73 mounted on the end portions or studs 69 and 70.

Two openings 75 and 76 are also formed in the web 45 of the end plate 36 for purposes which will be discussed in greater detail presently, the opening 75 being substantially circular in shape and the opening 76 being substantially oval in shape, as is best seen in Fig. 3.

Figure 4:
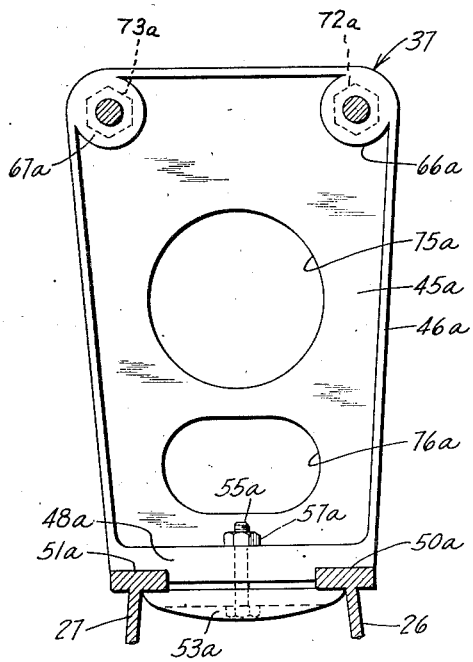
Fig. 4 is a sectional view taken substantially along the line 4—4 in Fig. 1.

The end plate 37, Fig. 4, is substantially of the same construction as the lower end portion, or body member 43 of the end plate 36, and the parts thereof which are similar to corresponding parts of the end plate 36 are indicated in the drawings by the same reference numerals with the suffix "a" added thereto. It will be seen that the end plate 37 differs from the end plate 36 in not having an upper arm or projection thereon such as the arm 59, the end plate 37 terminating at its top at the outer face of the flange 46a.

Two threaded end portions or studs 69a and 70a, corresponding to the studs 69 and 70, project from the ends of the side bars 40 and 41, respectively, opposite the ends from which the studs 69 and 70 extend, and project through suitable openings formed in the bosses 66a and 67a, respectively, of the end plate 37, Figs. 2 and 4. Two nuts 72a and 73a are mounted on the studs 69a and 70a and releasably hold the latter in their aforementioned position in the end plate 37.

The main body portions of the two side bars 40 and 41 are circular in cross-section, Fig. 3, and, as is best seen in Figs. 1 and 2, are substantially the same diameter as the boses 66, 67, 66a and 67a on the end plates, being held in abutting relation therewith by the nuts 72, 73, 72a and 73a. Thus it will be seen that the two end plates 36 and 37 and the two side bars 40 and 41, when disposed in the assembled relation shown in the drawings, form a rigid frame member. Two bolts 71 and 74 are mounted in suitable tapped openings, formed in the web 45 of the end plate 36 and afford adjustable abutment members engageable with the headstock 24 for spacing the frame 20 therefrom. Means such as lock-nuts 78 may be used to secure the bolts 74 and 75 in adjusted position in the web 45.

The tool holding device 34 includes a housing 81, comprising a casing 77 and a substantially U-shaped supporting member 79 mounted in inverted position on the upper end portion of the casing 77, the supporting member 79 being secured to the casing 77 by any suitable means such as welding 80.

Two wings or hanger members 82 and 83, Figs. 2 and 6, project outwardly from opposite sides of the casing 77. The hangers 82 and 83 have cylindrical shaped openings 85 and 86, respectively, formed therein through which the side bars 40 and 41 extend to thereby support the housing 81, the openings 85 and 86 being of such size that the sidewalls thereof snugly engage the exterior surface of side bars 40 and 41, without binding thereon, to thereby prevent movement of the housing 81 transversely to the bars 40 and 41. A rod 87 and four set-screws 89 are effective to hold the tool-holding device 34 against longitudinal movement on the rods 40 and 41, the rod 87 having one end connected to the U-shaped member 79 and the other end thereof connected to the end plate 36, and the set-screws 89 being mounted in the lower portion of the hanger members 82 and 83 and releasably engaged with the rods 40 and 41. It will be understood that different length rods 87 may be used to hold the tool-holding device 34 in different desired positions relative to the end plate 36.

The casing 77 has a cylindrical-shaped bore 88 extending vertically therethrough, and a cylinder 90, Fig. 5, is mounted in the bore 88 for reciprocation therein.

The cylinder 90 has a cylindrical-shaped opening 92 extending axially therethrough. The outer end portions 94 and 95 of the opening 92 are enlarged to afford shoulders 97 and 98 therein. Two ball bearings 100 and 101 are mounted in the enlarged portions 94 and 95, respectively, of the opening 92, for a purpose which will be discussed in greater detail presently, and are held in engagement with the respective shoulders 97 and 98 by suitable means such as discs 102 and 103 screwed into the outer end portions of the passageway 92.

An opening 105 extends through the center of the closed end portion of the U-shaped supporting member 79 in axial alignment with the opening 92 in the cylinder 90, and an elongated shaft 107 extends through the openings 92 and 105 and is rotatably mounted therein, being journaled in the bearings 100 and 101.

As is best seen in Fig. 5, the shaft 107 comprises three separate parts, namely, a spindle 109, a sleeve 111 and a rod or bolt 113, all secured together to form a unitary member as will be discussed in greater detail hereinafter.

The spindle 109 is journaled in the bearing 101 and has one end positioned in abutting relation to the bearing 100, and the other end projecting downwardly from the housing 81. The latter end of the spindle has a tapered bore 115 formed therein which is adapted to receive the tapered shank of a cutter holder or a tool having a conventional Morse taper. In the drawings, a cutter holder 117, having a bore 118 formed therein, in which the shank of a cutter or tool may be mounted in a manner well known to those skilled in the art, is shown. However, in some instances it is desirable to insert the shank of a tool directly into the spindle 109, and it will be understood that my invention is not limited to the use of the cutter holder 117 but that other types of cutter holders, tools, and the like, may be used as desired by those skilled in the art without departing from the purview of my invention.

The sleeve 111 has one end portion journaled in the bearing 100 and in abutment with the adjacent end of the spindle 109. The other end of the sleeve 111 projects upwardly from the housing 75 through the opening 105, the midportion of the sleeve 111 being journaled in this latter opening.

The bolt or rod 113 has a head 120 formed on one end thereof and is mounted in the housing 81 with the head 120 positioned in the inner end portion of the tapered bore 115 in the spindle 109 and the shank thereof projecting upwardly through the sleeve 111. A nut 122 is mounted on the free upper end portion of the bolt 113 and is engaged with the upper edge of the sleeve 111, this nut being effective during normal operation of my attachment to hold the sleeve 111 and the spindle 109 in tight frictional engagement with each other so that the shaft 107 is rotatable as a unit in the bearing 100 and 101, to thereby rotate a tool supported by the spindle 109, as will be described presently. Suitable means such as a pin 123 may be used to hold the nut 122 in adjusted position on the bolt 113. A threaded extension or stud 125 preferably projects from the head 120 of the bolt 113 into the tapered opening 115 and is engageable in a tapped opening 126 provided in the cutter holders or tools used in my attachment, to firmly hold the cutter holders or tools in operative position in the spindle 109. The direction of the threads on the extension 125 is such that the tool or cutter holder with which they are engaged is prevented from unscrewing therefrom during normal operative rotation of the spindle 109 and thereby insures that the cutter holder or tool will remain in proper position in the spindle 109 during a machine operation.

A pulley wheel 128, of the type adapted to be driven by a V-belt, and having a ball bearing 130, is mounted on a cylindrical-shaped projection 132 formed on the closed end portion of the U-shaped member 79, the projection 132 extending around, and affording a portion of the side walls for the opening 105 through which the sleeve 111 projects.

The wheel 128 has a hub 134 projecting from one side thereof, and a spline 136 formed in the hub 134, Fig. 2, is engaged in an elongated slot 138, Figs. 2 and 5, formed in the outer surface of the sleeve 111, to afford a driving connection between the pulley 128 and the shaft 107. The slot 138 is of considerably greater length than the spline 136 and, therefore, it will be seen that the shaft 107 may be moved longitudinally with relation to the pulley wheel 128 without interrupting the driving connection between the wheel 128 and the slot 107, as will be discussed in greater detail presently.

The power for driving the shaft 107 of my invention, to thereby rotate the spindle 109 and, therefore, the tool carried thereby in an operation of the attachment 20, is provided by the lathe 22. For this purpose a coupling member 140 is mounted in the headstock 24 of the lathe 22, in operative engagement with the drive spindle thereof, and projects from the headstock 24 outwardly through the opening 75 in the end plate 36. A V-pulley 142 is mounted on the free end portion of the coupling member 140 for rotation therewith and is connected to the pulley wheel 128 by a V-belt 144.

Two idler pulleys 146 and 147, for guiding the V-belt 144 between the drive pulley 142 and the pulley wheel 128, are rotatably mounted on a shaft 148 mounted in one end portion of an arm 150, Figs. 1 and 2. The other end of the arm 150 is pivotally mounted on a shaft 152 extending through two ears 154 and 155, Fig. 2, projecting from the end plate 36, the arm 150 projecting forwardly from the ears 154 and 155 through a slot 157, formed in the web 61 of the arm 59, Fig. 3. The slot 157 is large enough to permit relatively free pivotal movement of the arm 150 on the shaft 152. A threaded rod 159, having one end pivotally connected to the arm 150 by a pin 161, extends through the upper end portion of the end plate 36 and affords means for adjusting the position of the arm 150 on the shaft 152. Suitable means such as a nut 163, mounted on the end of the rod 159, adjusts the effective length of the rod 159 to thereby support the arm 150 in proper position. Thus it will be seen that by manipulating the nut 163 the position of the arm 150 and, therefore, of the idler pulleys 146 and 147 may be readily adjusted to thereby adjust the tension of the V-belt 144.

Vertical adjustment of the shaft 107 and, therefore, of the spindle 109 and a tool carried thereby, is afforded in my novel attachment by readily manipulated manually operable means. For this purpose a rack 165, Figs. 5 and 6 is mounted in a slot 166 formed in the side wall of the cylinder 90 and extends longitudinally thereof, suitable means such as screws 168 and 169 securing the rack 165 in position in the slot 166. A shaft 171 is journaled in suitable bearings 173 and 174 formed in the casing 77, and a gear 176, engaged with the rack 165, is secured to the shaft 171 by suitable means such as a screw 178, for rotation therewith. A worm gear 180, operatively engaged with a worm 182 is also mounted on the shaft 171 and secured thereto by a screw 184. The worm 182 is secured to a shaft 186 which is journaled in the casing 77 and extends outwardly therefrom. A handle 188 is mounted on the outwardly extending portion of the shaft 186 and is operable to be manually rotated to thereby rotate the worm 182, the gear 180, the shaft 171, and the gear 176, and thereby move the rack 165 upwardly or downwardly, as viewed in Fig. 5, to adjust the vertical position of the cylinder 90 within the housing 81. Suitable indicia such as, for example, the vernier 190, shown in Fig. 1, may be used, if desired, to accurately indicate the vertical adjustment of the cylinder 90 within the housing 81, as indicated by the position of the handle 188.

It will be remembered that the shaft 107, although rotatably mounted in the cylinder 90, is secured therein against longitudinal movement relative thereto by the engagement of bearings 100 and 101 and the discs 102 and 103. Thus it will be seen that movement of the cylinder 90 in a longitudinal direction is effective to impart like movement to the shaft 107, and, therefore, when the position of cylinder 90 is adjusted by manipulation of the handle 188, as previously discussed, a like adjustment of the shaft 107 is effected.

A common type of locking device 192, Figs. 1 and 5, comprising a handle 193 which is effective to rotate a cam or off-set portion 195 mounted on a shaft 196, is operable to releasably secure the cylinder 90 and, therefore, the shaft 107 in adjusted position in the housing 81. The shaft 196 on which the locking device 192 is mounted, is rotatably mounted in an ear 198, Fig. 8, projecting outwardly from the housing 81. The cam 195 extends into the housing 81 through a slot 200 and is so positioned on the shaft 196 that when the handle 193 occupies the position shown in solid lines in Fig. 5, the cam is tightly engaged with the cylinder 90 and is effective to frictionally hold the cylinder 90 in adjusted position. When it is desired to free the cylinder 90 from such locking engagement with the locking device 192 the handle 193 may be manually moved to the position shown in dotted lines in Fig. 5 which is effective to rotate the cam 195 on the shaft 196 in a clockwise direction, as viewed in Fig. 5, out of engagement with the cylinder 90.

*Operation*

In a typical operation of my novel attachment, the usual live-center would normally be removed from the headstock 24 and the coupling member 140, having the drive pulley 142 mounted thereon, would be substituted therefor. The attachment 20, comprising the frame member 32 and the tool-holding device 34 may then be mounted on the ways 26 and 27 of the lathe 22, with the spacing bolts 74 and 76 in firm engagement with the headstock 24 and the clamping plates 53 and 53a may be moved into clamping engagement with the ways by tightening the nuts 57 and 57a. The engagement of the spacing bolts 71 and 74 with the headstock 24 insures the proper spacing of the frame member 32 from the headstock, and also affords added support and rigidity to the end plate 36.

The frame member 32 having been placed in proper position on the ways 26 and 27, the V-belt 145 may then be positioned over the drive pulley 142, the pulley wheel 128, and the idler pulleys 146 and 147 and the tension on the V-belt 145 may be adjusted by turning the nut 163 in the proper direction to effect adjustment of the hanger arm 150.

The work upon which the machine operation is to be performed may then be mounted in the vise 31 on the carriage 29 and a milling cutter, boring tool, or other tool which it is desired to use in this operation may be mounted in the spindle 109 of the shaft 107. Vertical adjustment of the tool, relative to the work positioned in the vise 31 may be effected by rotating the handle 188 to thereby raise and lower the cylinder 90 and the shaft 107 so that the tool is disposed in proper operative position relative to the work.

When using my novel attachment in operations requiring lateral movement of the work and tool relative to each other, the usual longitudinal feed and cross feed of the lathe 22 may be utilized to effect lateral movement of the work relative to the tool, the tool, in this instance, being held in stationary vertical position in the holding device 34 and being rotated by the driving connection between the pulley 142 and the pulley wheel 128.

In those operations wherein it is necessary to move the tool vertically relative to the work being held in the vise 31, such as, for example, in boring operations, the work may be disposed in the desired position relative to the tool by manipulating the longitudinal feed and cross feed of the lathe 22 and may then be locked in this position by disconnecting the automatic longitudinal and cross feed of the lathe. Vertical movement of the tool, during such an operation, may be effected by turning the handle 188 to thereby cause the cylinder 90 and the shaft 107 and, therefore, the spindle 109 and the tool held thereby, to be moved in a vertical direction. During such vertical movement of the shaft 107, the sleeve 111, through its splined connection with the pulley wheel 128 is freely slidable through the pulley wheel 128 while maintaining its driving connection therewith.

In some instances it may be found that certain work pieces such as elongated rods, pipes and the like do not fit conveniently between the end plates 36 and 37, and in such instances the work pieces may often be extended through the openings 75a or 76a in the end plate 37, with that portion of the work piece upon which the machine operation is to be performed disposed in operative position between the end plates 36 and 37 and with the vise 31 and the tool-holding device 34 properly adjusted for the particular operation.

From the foregoing it will be seen that I have provided a novel milling and boring attachment for lathes which may be readily positioned on the ways of the usual lathe and which, when so positioned, is readily operable, in a novel and expeditious manner, to perform milling, boring, and like operations.

Also it will be seen that through the novel construction of my attachment vertical adjustment of the tools held thereby may be quickly and easily accomplished in a novel and expeditious manner.

In addition it will be seen that the novel construction of my attachment insures that the tool supported thereby will be firmly supported during an operation of the attachment and will be accurately positioned relative to the work upon which the operation is being performed.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a lathe having a headstock, a rotatable drive member projecting from said headstock, a drive pulley operatively connected to said drive member and rotatable thereby, and ways extending from said headstock, two parallel end plates releasably secured to said ways and extending transversely thereto, one of said end plates having an opening therein and being so disposed relative to said headstock that said drive member extends through said opening and said drive pulley is disposed on the opposite side of said one end plate from said headstock, two parallel side bars interconnecting said end plates, a housing mounted on said side bars, means for holding said housing in fixed position relative to said end plates, a spindle for holding tools rotatably mounted in vertically extending position in said housing and vertically slidable therein, means for vertically adjusting said spindle in said housing, a pulley wheel mounted on said spindle and operable upon rotation to rotate the latter, said spindle being longitudinally slidable through said pulley wheel, and a belt operatively connecting said pulley wheel to said drive pulley and operable to rotate said pulley wheel upon rotation of said drive pulley.

2. A milling and boring attachment for lathes of the type having a headstock, a rotatable drive member projecting from said headstock, a drive pulley mounted on said drive member and rotatable therewith, and ways projecting from said headstock in the same direction as said drive member, said attachment comprising a frame member having two parallel end plates and two parallel side bars interconnecting said end plates, one of said end plates having an opening therein for receiving said drive member therethrough with said drive pulley positioned within the area defined by said frame member when said frame member is disposed in operative position on said ways, means for securing said frame member in such position on said ways, a housing mounted on said side bars, a spindle mounted in said housing in vertically extending position, said spindle being movable in a longitudinal direction within said housing and being adapted to operatively hold a tool, means for vertically adjusting the position of said spindle within said housing, a pulley wheel connected to said spindle for driving the latter, and means engaged with said pulley wheel for drivingly connecting said drive pulley to said pulley wheel of such a lathe when said frame member is disposed in said operative position.

3. A milling and boring attachment for lathes of the type having a headstock, a rotatable drive member projecting from said headstock, a drive pulley mounted on said drive member and rotatable therewith, and ways projecting from said headstock in the same direction as said drive member, said attachment comprising a frame member having two parallel end plates and two parallel side bars interconnecting said end plates, one of said end plates having an opening therein, means on said frame member for securing said frame member in operative position on said ways wherein said drive member extends through said opening with said drive pulley positioned within the area defined by said frame member, a housing mounted on said side bars, a bearing member movably mounted in said housing, a shaft extending through said bearing member and said housing and including a spindle adapted to hold a tool in operative position, said shaft being connected to said bearing member for longitudinal movement therewith, means for adjusting the position of said bearing member in said housing to thereby adjust the position of said shaft relative to such a lathe, a pulley wheel mounted on said shaft and having a driving connection therewith, said shaft being movable in a longitudinal direction relative to said pulley wheel, and means including a belt adapted to operatively connect said drive pulley to said pulley wheel for rotating said pulley wheel and said shaft upon rotation of said drive pulley when said frame member is in said operative position.

4. In an attachment for lathes having a headstock, ways projecting from said headstock, a drive spindle projecting from said headstock, and a drive pulley mounted on said spindle for rotation therewith, two parallel end plates transversely mounted on the ways of the lathe, means for releasably securing said end plates to said ways, one of said end plates having an opening formed therein and being so positioned relative to said headstock that said drive spindle projects through said opening and said pulley is positioned on the opposite side of said one end plate from said head stock, two parallel bars spaced above said ways and connecting said end plates together, a housing mounted on said two bars, a shaft rotatably mounted in said housing, said shaft projecting between said two bars and having a portion adapted to hold a tool, a pulley wheel mounted on said shaft for rotating the latter, a plurality of idler pulleys mounted on said one end plate, and a drive belt operatively trained over said drive pulley, said idler pulleys, and said pulley wheel for driving said pulley wheel and said shaft upon rotation of said drive pulley.

5. In a lathe having a headstock, a rotatable drive member projecting from said headstock, driving means operatively connected to said drive member and rotatable thereby, and ways extending from said headstock, two parallel end plates releasably secured to said ways and extending transversely thereto, one of said end plates having an opening therein and being so disposed relative to said headstock that said drive member extends through said opening and said driving means is disposed on the opposite side of said one end plate from said headstock, elongated supporting means interconnecting said end plates, a housing mounted on said supporting means, means for holding said housing in fixed position relative to said end plates, a spindle for holding tools rotatably mounted in vertically extending position in said housing and vertically movable therein, means for vertically adjusting said spindle in said housing, a driving member mounted on said spindle and operable upon rotation to rotate the latter, said spindle being longitudinally slidable through said driving member, and other driving means operatively connecting said driving member to said first mentioned driving means and operable to rotate said driving member upon rotation of said first mentioned driving means.

6. In an attachment for lathes having a headstock, ways projecting from said headstock, a drive spindle projecting from said headstock, and driving means mounted on said spindle for rotation therewith, two parallel end plates transversely mounted on the ways of the lathe, means for releasably securing said end plates to said ways, one of said end plates having an opening formed therein and being so positioned relative to said headstock that said drive spindle projects through said opening and said driving means is positioned on the opposite side of said one end plate from said headstock, supporting means spaced above said ways and connecting said end plates together, a housing mounted on said supporting means, a shaft rotatably mounted in said housing, said shaft projecting toward said ways and having a portion adapted to hold a tool, a driving member mounted on said shaft for rotating the latter, and other driving means operatively connected to said driving member and said first mentioned driving means for rotating said driving member upon rotation of said first mentioned driving means.

RAYMOND C. PALMER.

References Cited in the file of this patent

UNITED STATES PATENTS

| Number | Name | Date |
|---|---|---|
| 1,614,432 | Meyer | Jan. 11, 1927 |
| 2,011,835 | Stull | Aug. 20, 1935 |
| 2,106,835 | Forward | Feb. 1, 1938 |
| 2,116,248 | Moser | May 3, 1938 |
| 2,178,130 | Zwick | Oct. 31, 1939 |
| 2,203,943 | Davis | June 11, 1940 |
| 2,375,789 | Hungerford | May 15, 1945 |
| 2,386,461 | Hellman | Oct. 9, 1945 |
| 2,455,662 | Dyer | Dec. 7, 1948 |

FOREIGN PATENTS

| Number | Country | Date |
|---|---|---|
| 291,202 | Germany | May 26, 1917 |